United States Patent
Samukawa

(10) Patent No.: US 7,409,984 B2
(45) Date of Patent: Aug. 12, 2008

(54) AIR-CONDITIONER FOR VEHICLE USE

(75) Inventor: Katsuhiko Samukawa, Okazaki (JP)

(73) Assignee: Denso Corporation, Kariya (JP)

( * ) Notice: Subject to any disclaimer, the term of this patent is extended or adjusted under 35 U.S.C. 154(b) by 660 days.

(21) Appl. No.: 11/116,043

(22) Filed: Apr. 27, 2005

(65) Prior Publication Data

US 2005/0263278 A1 Dec. 1, 2005

(30) Foreign Application Priority Data

Apr. 28, 2004 (JP) ............................. 2004-133658

(51) Int. Cl.
*B60H 1/00* (2006.01)

(52) U.S. Cl. .................. 165/202; 165/204; 165/232; 165/244; 62/244; 62/228.1; 62/229

(58) Field of Classification Search ................ 165/202, 165/203, 204, 232, 244; 62/244, 228.1, 229
See application file for complete search history.

(56) References Cited

U.S. PATENT DOCUMENTS

| | | | | |
|---|---|---|---|---|
| 6,009,934 | A | * | 1/2000 | Sunaga et al. .................. 62/244 |
| 6,123,267 | A | * | 9/2000 | Baker et al. .................. 165/204 |
| 6,430,951 | B1 | * | 8/2002 | Iritani et al. ................... 62/229 |
| 2005/0210900 | A1 | * | 9/2005 | Oomura et al. ............. 62/228.1 |

FOREIGN PATENT DOCUMENTS

JP 60-004409 1/1985

* cited by examiner

*Primary Examiner*—Ljiljana (Lil) V Ciric
(74) *Attorney, Agent, or Firm*—Harness, Dickey & Pierce, PLC

(57) ABSTRACT

When a switching signal to switch the mode to the defroster mode is generated and the target air volume is smaller than a predetermined air volume α, the target air volume is automatically increased to the predetermined air volume α. In doing so, an increase starting point of time of increasing the target air volume is determined according to the blowout mode immediately before a switch signal to switch the mode to the defroster mode is generated.

9 Claims, 5 Drawing Sheets

Fig.5
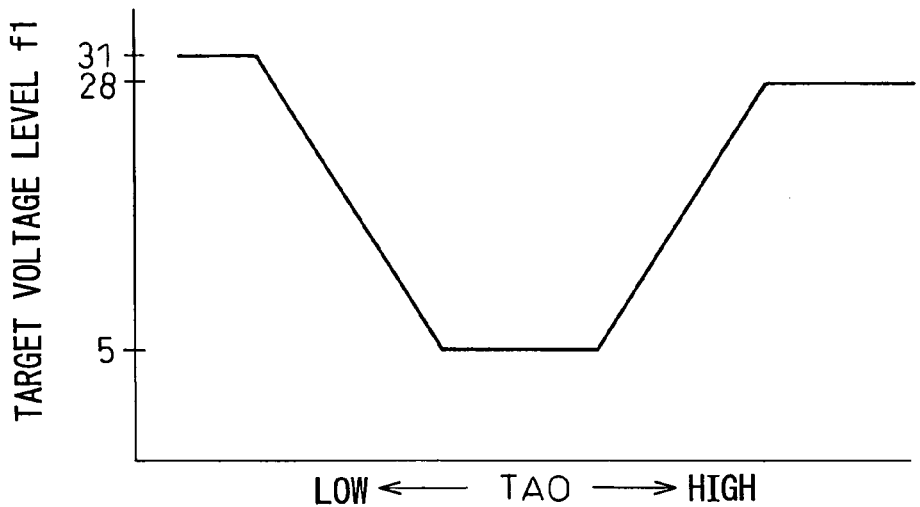
Fig.6
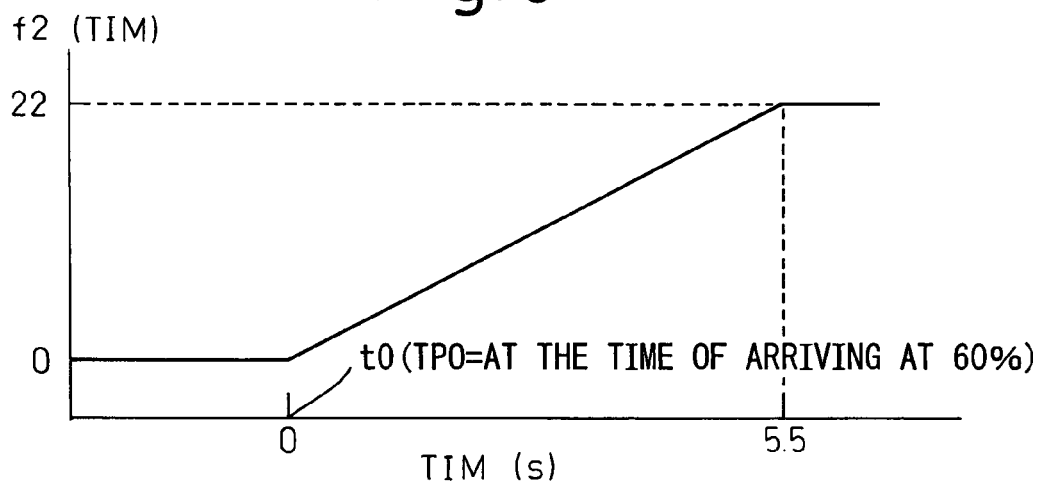
Fig.7
| BLOWOUT MODE | FACE → B/L → FOOT → F/D → DEF |
|---|---|
| (a) VOLTAGE LEVEL $f_{DEF}$ | 5 → 5 → 7 → 15 → 22 |
| (b) VOLTAGE LEVEL $f_{DEF}$ | 5 → 5 → 5 → 15 → 22 |

AIR-CONDITIONER FOR VEHICLE USE

BACKGROUND OF THE INVENTION

1. Field of the Invention

The present invention relates to a technique of controlling an air volume, at the time when the operation mode is switched to the defroster mode, in an air-conditioner for vehicle use.

2. Description of the Related Art

The official gazette of JP-A-60-4409 describes an air-conditioner for vehicle use in which a passenger selects the defroster mode by manual operation as the blowout mode for blowing out air into a vehicle passenger compartment, and then this operation of selecting the defroster mode is judged by the air-conditioner and the minimum level of an air volume blown out into the vehicle passenger compartment is increased by a predetermined value.

According to this prior art, as a volume of air blown out at the time of the defroster mode is increased, the capacity of removing a fog from the windshield can be enhanced.

However, according to this prior art, when the passenger selects the defroster mode by a manual operation, immediately after the manual operation, the minimum level of the volume of air blown out into the vehicle passenger compartment is increased. Therefore, such a phenomenon is caused that the volume of air blown out into the vehicle passenger compartment is increased before the blowout mode is completely switched to the defroster mode.

That is, an increase in the volume of air can be instantaneously conducted by an electrical control operation of increasing voltage impressed upon a fan motor. On the other hand, when the blowout mode is switched, it is necessary to conduct a mechanical operation of moving a blowout mode door, between a plurality of blowout ports, by a predetermined distance. Therefore, as compared with a period of time in which the volume of blowout air is increased, it takes a long period of time when the blowout mode door is moved between the plurality of blowout ports.

As a result, before the blowout mode is completely switched to the defroster mode, the volume of air blown out into the vehicle passenger compartment is increased. Accordingly, when the blowout mode is switched from the face mode to the defroster mode, a volume of air blown out from the face blowout port is increased before the completion of the blowout mode, and the noise of blowing air is increased.

In this case, the face blowout port is located at the closest position to the ears of the passenger, and an air passage connected to the face blowout port is designed in such a manner that the air passing resistance is the smallest among a plurality of blowout ports so that the maximum cooling performance (the cooling down performance) can be ensured. Therefore, the passenger can easily feel an increase in the sound intensity of noise caused by the increase in the volume of air blown out from the face blowout port. As a result, the passenger is made uncomfortable.

SUMMARY OF THE INVENTION

The present invention has been accomplished to solve the above problems. It is an object of the present invention to suppress an increase in the volume of air blown out from the face blowout port when an increase in the volume of air blown out into the vehicle passenger compartment is controlled according to the switching operation to the defroster mode.

In order to accomplish the above object, according to a first aspect of the present invention, there is provided an air-conditioner for vehicle use comprising: an air blowing means (8) for blowing air toward a vehicle passenger compartment; a face blowout port (20) for blowing out air sent from the air blowing means (8) to a passenger face side in the vehicle passenger compartment; a foot blowout port (21) for blowing out air sent from the air blowing means (8) to a passenger foot side in the vehicle passenger compartment; a defroster blowout port (19) for blowing out air sent from the air blowing means (8) to a windshield side in the vehicle passenger compartment; blowout mode doors (22 to 24) for switching a blowout mode at least among a face mode in which air is blown out from the face blowout port (20), a foot mode in which air is blown out from the foot blowout port (21) and a defroster mode in which air is blown out from the defroster blowout port (19); a door drive device (25) for driving the blowout mode doors (22 to 24); and a control unit (30) for controlling the air blowing means (8) so that an air volume of the air blowing means (8) can be a target air volume and for controlling an operational position of the door drive device (25) so that each blowout mode can be provided wherein, when a switching signal to switch the mode to the defroster mode is generated and the target air volume is smaller than a predetermined air volume, the target air volume is automatically increased to the predetermined air volume and the control unit (30) includes a defroster mode air volume control means (S870) for determining an increase starting point of time of increasing the target air volume according to the blowout mode when a switch signal to switch the mode to the defroster mode is generated.

A switching signal for switching the blowout mode to the defroster mode is usually generated by the blowout mode switch manually operated by a passenger. However, the switching signal for switching the blowout mode to the defroster mode may be automatically generated by judging that the environmental condition is in a fogging state in which the windshield tends to fog.

As the door drive device (25) and the blowout mode doors (22 to 24) are integrally operated by being linked with each other, the operating position of the door drive device (25) includes an operating position of the member, which is integrally operated by being linked with the door drive device (25), such as blowout mode doors (22 to 24).

According to a second aspect of the present invention, the defroster mode air volume control means (S870) determines the increase starting point of time of the target air volume according to the blowout mode immediately before the generation of a switch signal when the switch signal to switch the mode to the defroster mode is generated.

Due to the foregoing, when it is arranged that a volume of air is increased according to the switching operation to the defroster mode, only after the operating position of the door drive device (25) has passed through the position corresponding to the face mode, does a volume of air start increasing. Therefore, an increase in the volume of air under the condition that the operating position of the door drive device (25) is located at the position corresponding to the face mode can be positively prevented.

Therefore, it is possible to previously prevent the occurrence of a problem that a sound intensity of noise, which is caused by a flow of air sent from the face blowout port (20) at the time of switching the mode to the defroster mode, is increased.

According to a third aspect of the present invention, the defroster mode air volume control means (S870) starts increasing the target air volume after an operational position of the door drive device (25) has passed through the position corresponding to the face mode in the case where the blowout mode immediately before the switching signal is generated is a face mode.

According to a fourth aspect of the present invention, the defroster mode air volume control means (S870) calculates the time ($T_m$) to determine the increase starting point of time of increasing the target air volume according to the blowout mode at the time of generation of the switching signal, and the target air volume starts increasing when the time ($T_m$) has passed after the generation of the switching signal.

According to a fifth aspect of the present invention, the air-conditioner for vehicle use further comprises a position detecting means (25a) for detecting positional information relating to an operational position of the door drive device (25), wherein the defroster mode air volume control means (S870) judges the blowout mode at the time of generation of the switching signal according to the detection signal from the position detecting means (25a).

According to a sixth aspect of the present invention, the blowout mode doors (22 to 24) switch the blowout mode in the order of the face mode, the foot mode and the defroster mode by changing the operational position of the door drive device (25), and the defroster mode air volume control means (S870) starts increasing the target air volume after the operational position of the door drive device (25) has been moved to a position corresponding to the foot mode when the switching signal is generated.

Due to the foregoing, attention is paid to the order of switching the blowout modes and, after the operating position of the door drive device (25) has been moved to a position corresponding to the foot mode, it starts to increase a volume of air so that the volume of can be increased to the target value. Therefore, the annoyance that a sound intensity of noise caused by air blown out from the face blowout port (20) at the time of switching to the defroster mode can be positively eliminated by a simple process of control.

According to a seventh aspect of the present invention, the air-conditioner for vehicle use further comprises a position detecting means (25a) for detecting positional information relating to the operational position of the door drive device (25), wherein it is judged according to the detection signal from the position detecting means (25a) that the operational position of the door drive device (25) is moved to a position corresponding to the foot mode.

According to an eighth aspect of the present invention, the target air volume is increased by a predetermined ratio with respect to the time which has passed after the increase starting point.

Due to the foregoing, the target air volume can be gradually increased according to the time which has passed after the start of increasing the volume of air. Therefore, it is possible to prevent a sudden increase in the volume of air at the time of switching the mode to the defroster mode. Accordingly, it is possible to prevent a passenger from feeling a discomfort which is caused by a sudden increase in the volume of air.

According to a ninth aspect of the present invention, when the target air volume immediately before the generation of the switching signal is not less than the predetermined air volume, this target air volume is made to be a target air volume at the time of the defroster mode.

In the case where a volume of air before the mode is switched to the defroster mode is not less than a predetermined volume of air necessary for ensuring the defroster performance (the defrosting performance), the volume of air before the mode is switched may be used as it is, that is, it is unnecessary to conduct controlling so as to increase the volume of air.

Incidentally, the reference numerals in parentheses, to denote the above means, are intended to show the relationship of the specific means which will be described later in an embodiment of the invention.

The present invention may be more fully understood from the description of preferred embodiments of the invention set forth below, together with the accompanying drawings.

BRIEF DESCRIPTION OF THE DRAWINGS

In the drawings:

FIG. 5 is a characteristic diagram showing a method of calculating the target voltage level (the target air volume) at the time of automatic control in the first embodiment;

FIG. 6 is a characteristic diagram showing a method of calculating an increase in the target voltage level (the target air volume) at the time of switching the mode to the defroster mode in the second embodiment; and FIG. 7 is a schematic illustration showing a method of calculating an increase in the target voltage level (the target air volume) at the time of switching the mode to the defroster mode in the third embodiment.

DESCRIPTION OF PREFERRED EMBODIMENTS

Figure 1:
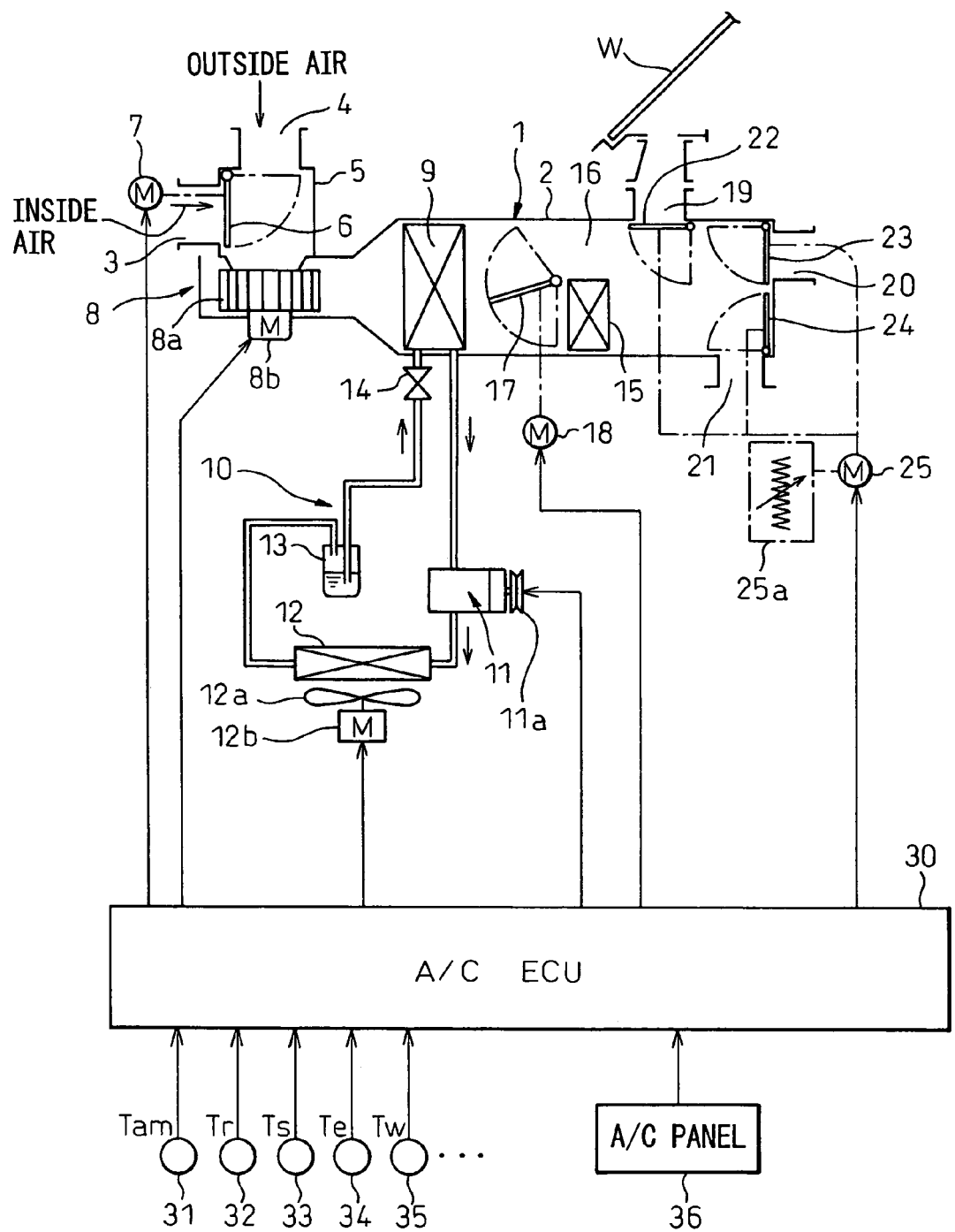
FIG. 1 is an arrangement view showing the entire system of the first embodiment of the present invention.

First of all, the first embodiment will be explained below. FIG. 1 is a view showing an outline of the overall arrangement of the first embodiment. The air-conditioner for vehicle use includes an interior air-conditioning unit 1 arranged inside the instrument panel (not shown) in the front portion of the vehicle passenger compartment. This interior air-conditioning unit 1 includes a case 2. In this case 2, an air passage, in which air is blown toward the vehicle passenger compartment, is composed.

In the most upstream portion of the air passage in case 2, the inside and outside air switching box 5 is arranged which has an inside air introducing port 3 and an outside air introducing port 4. In the inside and outside air switching box 5, the inside and outside air switching door 6, which is an inside and outside air switching means, is pivotally arranged.

The inside and outside air switching door 6 is driven by the servo motor 7 and switched between the inside air mode, in which the inside air (the air inside the vehicle passenger compartment) is introduced from the inside air introducing port 3, and the outside air mode in which the outside air (the air outside the vehicle passenger compartment) is introduced from the outside air introducing port 4.

On the downstream side of the inside and outside air switching box 5, an electric type fan 8 is arranged which generates a flow of air flowing toward the vehicle passenger compartment. The fan 8 is composed in such a manner that the centrifugal-type fan 8a is driven by the motor 8b. On the downstream side of the fan 8, an evaporator 9 is arranged which cools a flow of air flowing in the case 2. The evaporator 9 is a heat exchanger used for cooling air by which a flow of air sent from the fan 8 is cooled. The evaporator 9 is one of the components composing the refrigerating cycle device 10.

The refrigerating cycle device 10 is a well known device in which the refrigerant is circulated to the evaporator 9 from the delivery side of the compressor 11 via the condenser 12, the receiver 13 and the expansion valve 14 which composes a decompressing means. The outside air (cooling air) is blown to the condenser 12 by the electric type cooling fan 12a.

In the refrigerating cycle device 10, the compressor 11 is driven by a vehicle engine (not shown) via the electromagnetic clutch 11a. Accordingly, when the electromagnetic clutch 11a is electrically turned on and off, the compressor 11 is controlled so that it can be turned on and off. The evaporator 9 cools a flow of air, which is sent from the fan 8, when the two-phase refrigerant containing gas and liquid, the pressure of which is low because it is decompressed by the expansion valve 14, absorbs heat from the flow of air and evaporates.

On the other hand, in the interior air-conditioning unit 1, on the downstream side of the evaporator 9, the heater core 15 for heating air flowing in the case 2 is arranged. This heater core 15 is a heat exchanger used for heating air (cold air) which has passed through the evaporator 9. On the side of the heater core 15, the bypass passage 16 is formed, and bypass air of the heater core 15 flows in this bypass passage 16.

The air mixing door 17 is pivotally arranged between the evaporator 9 and the heater core 15. This air mixing door 17 is driven by the servo motor 18, and the rotating position (the degree of opening) of the air mixing door 17 can be continuously adjusted.

By the degree of opening of this air mixing door 17, it is possible to adjust a ratio of the volume of air (the volume of hot air) passing through the heater core 15 to the volume of air (the volume of cold air) passing through the bypass passage 16 and bypassing the heater core 15. Due to the foregoing, the temperature of the air blowing out into the vehicle passenger compartment can be adjusted. Accordingly, the temperature adjusting means for adjusting the temperature of air blowing into the vehicle passenger compartment is composed of this air mixing door 17.

In the most downstream portion of the air passage in the case 2, three types of blowout ports are provided. They are the defroster blowout port 19 for blowing out a flow of conditioned air toward windshield W of a vehicle, the face blowout port 20 for blowing out a flow of conditioned air toward the face of a passenger, and the foot blowout port 21 for blowing out a flow of conditioned air toward the feet of a passenger.

In the upstream portions of these blowout ports 19 to 21, the defroster door 22, the face door 23 and foot door 24 are pivotally arranged. These blowout mode doors 22 to 24 are operated being opened and closed by the commonly used servo motor 25 via a link mechanism not shown in the drawing.

In this embodiment, when the operational angle of the servo motor 25 is variably controlled, the control mode can be switched among the following five blowout modes. That is, when the operational angle of the servo motor 25 is changed from the minimum side to the maximum side, the blowout mode is changed in the order of face mode→bilevel mode→foot mode→foot and defroster mode→defroster mode.

In this case, in the face mode, the face blowout port 20 is opened by the face door 23 and a flow of conditioned air (cold air) is blown out toward the face of a passenger from the face blowout port 20. In the bilevel mode, both the face blowout port 20 and the foot blowout port 21 are simultaneously opened by the face door 23 and the foot door 24, and conditioned air is blown out toward the face and feet of the passenger.

In the foot mode, the foot blowout port 21 is opened by the foot door 24, and conditioned air (hot air) is blown out toward the foot of the passenger. At the time of operation of this foot mode, the defroster blowout port 19 may be opened a little by the defroster door 22, and a small volume of conditioned air may be blown out toward windshield W of the vehicle from the defroster blowout port 19.

In the foot and defroster mode, both the foot blowout port 21 and the defroster blowout port 19 are simultaneously opened by the foot door 24 and the defroster door 22, and conditioned air (hot air) is blown out toward the feet of the passenger and windshield W of the vehicle.

In the defroster mode, the defroster blowout port 19 is opened by the defroster door 22, and conditioned air (hot air) is blown out toward windshield W of the vehicle.

Next, an outline of the electric control unit of this embodiment will be explained as follows. The electric control unit 30 includes: a well known microcomputer having CPU, ROM and RAM; and a peripheral circuit of the microcomputer. The ROM of this air-conditioner control unit 30 stores a control program for air-conditioning control. Various calculations and processing are conducted according to this control program.

Sensor detection signals are inputted from the group of sensors 31 to 35 onto the input side of the air-conditioning control unit 30. Further, various operation signals are inputted from the air-conditioning panel 36 arranged close to the instrument panel (not shown) in the front portion of the vehicle passenger compartment.

Concerning the group of sensors, there are provided the outside air sensor 31 for detecting the outside air temperature (temperature outside the vehicle passenger compartment) $T_{am}$, the inside air sensor 32 for detecting the inside air temperature (temperature inside the vehicle passenger compartment) $T_r$, the sunshine sensor 33 for detecting the amount of sunshine $T_s$ incident into the vehicle passenger compartment, the evaporator temperature sensor 34 for detecting the evaporator blowout air temperature $T_e$ arranged in the air blowout portion of the evaporator 9, and the water temperature sensor 35 for detecting temperature $T_w$ of hot water (engine cooling water) flowing into the heater core 15.

Figure 2:
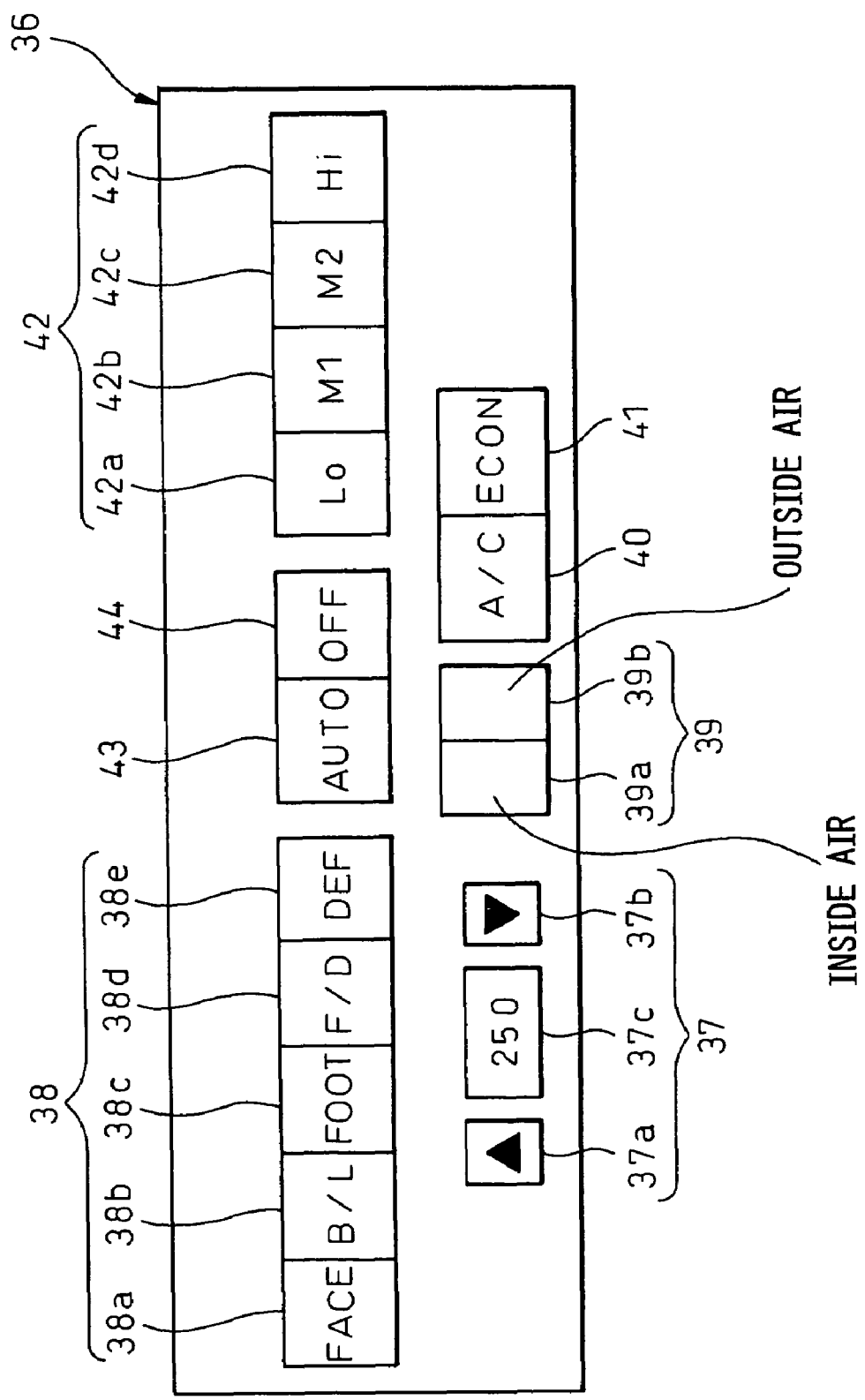
FIG. 2 is a front view showing the air-conditioning panel of the first embodiment.

On the air-conditioning panel 36, various operation switches are provided, that is, the switches 37 to 44 shown in FIG. 2 are arranged on the air-conditioning panel 36. The temperature setting switch 37 supplies a signal for setting a temperature. The temperature setting switch 37 includes the switch 37a for raising the setting temperature, the switch 37b for lowering the setting temperature, and the setting temperature display section 37c.

The blowout mode switch 38 supplies a signal for manually setting various blowout modes which are set by the blowout mode doors 22 to 24. The blowout mode switch 38 includes the face mode switch 38a, the bilevel mode switch 38b, the foot mode switch 38c, the foot defroster mode switch 38d, and the defroster mode switch 38e.

The inside and outside air changeover switch 39 supplies a signal for manually setting the inside air mode and the outside air mode by the inside and outside air switching door 6. This inside and outside air changeover switch 39 includes the inside air switch 39a and the outside air switch 39b.

The air-conditioning switch 40 supplies an operational command signal (ON signal of the electromagnetic clutch 11a) of the compressor 11. The economy switch 41 supplies a signal for raising the target evaporator blowout temperature TEO so as to reduce the rate of operation of the compressor 11.

The air volume changeover switch 42 is provided for sending a signal so that the air volume of the fan 8 can be manually set. The air volume changeover switch 42 includes: a switch 42a for a small volume of air; a switch 42b for a first middle volume of air; a switch 42c for a second middle volume of air which is larger than the first middle volume of air by a predetermined value; and a switch 42d for a large volume of air.

The auto-switch 43 sends a command signal of the state in which air-conditioning is automatically conducted. When the auto-switch 43 is turned on, even if the air-conditioning switch 40 is turned off, the electromagnetic clutch 11a is energized so that the compressor 11 can be operated and various air-conditioning devices can be automatically controlled.

The off-switch 44 sends a stopping signal to stop the air-conditioner. When the off-switch is operated, all the various air-conditioning devices are stopped.

The output side of the air-conditioning control unit 30 is connected to the electromagnetic clutch 11a of the compressor 11, the servo motors 7, 18, 25 composing the drive units of various doors, the motor 8b for driving the fan 8, and the motor 12b of the cooling fan 12a for cooling the condenser. Therefore, operation of these devices is controlled by an output signal outputted from the air-conditioning control unit 30.

Operation of this embodiment composed as described above will be explained below. First, explanations will be made into an outline of operation of the interior air-conditioning unit 1 as follows. Air introduced from the inside air introducing port 3 or the outside air introducing port 4 is blown into the case 2 toward the vehicle passenger compartment. The electromagnetic clutch 11a is energized so that the electromagnetic clutch 11a can be connected and the compressor 11 can be driven by the engine. Due to the foregoing, the refrigerant is circulated in the refrigerating cycle device 10.

First, a flow of air blown out by the fan 8 passes through the evaporator 9 and cooled and dehumidified. Next, this cold flow of air is divided to a flow of air passing through the heater core 15 and a flow of air passing through the bypass passage 16 according to the rotational position (the degree of opening) of the air mixing door 17. The flow of air passing through the heater core 15 is heated and becomes a flow of hot air, and the flow of air passing through the bypass passage 16 is left as a flow of cold air.

Figure 3:
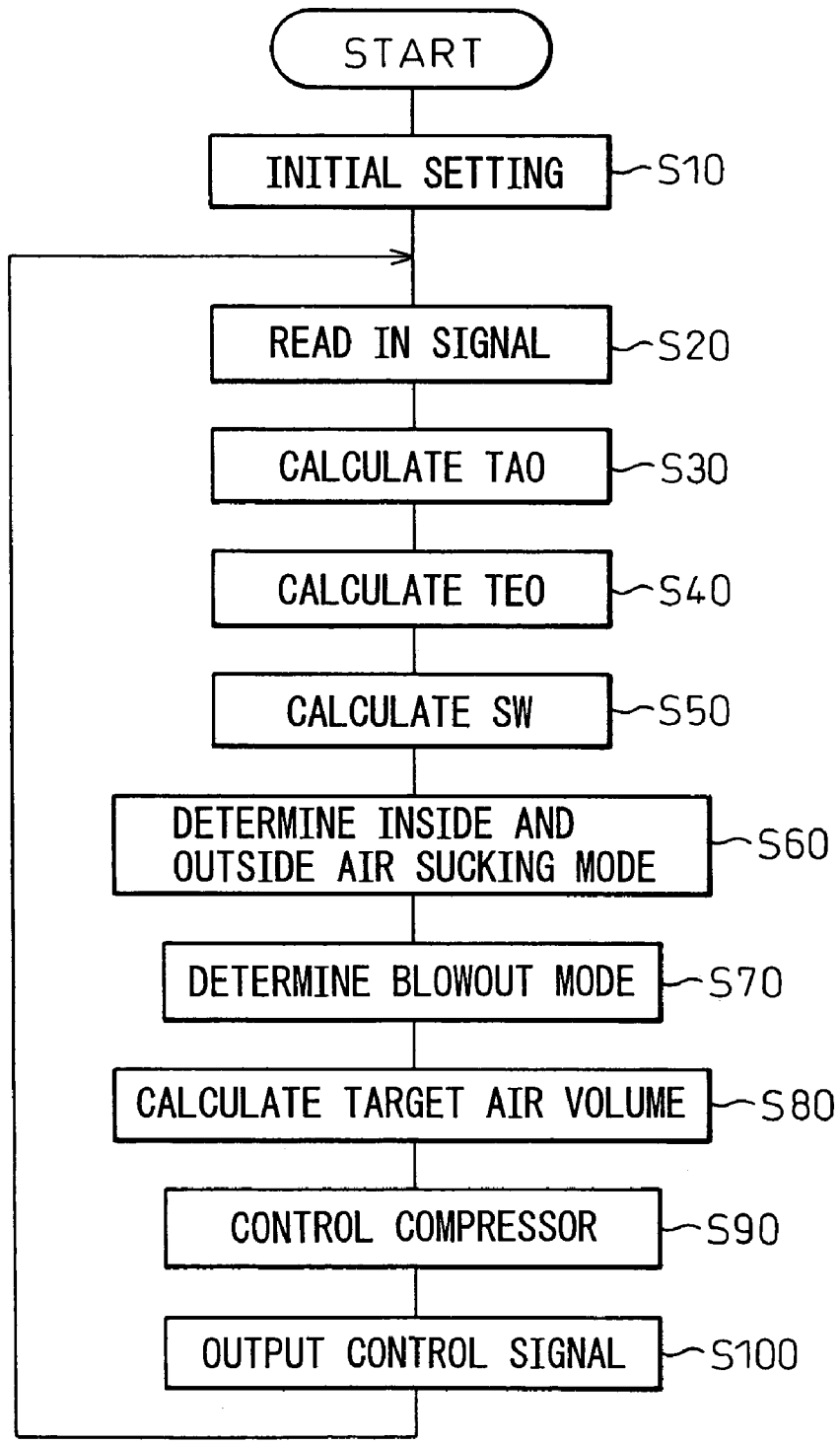
FIG. 3 is a flow chart showing an outline of the air-conditioning control of the first embodiment.

Accordingly, when a ratio of the volume of air (the volume of hot air) passing through the heater core 15 to the volume of air (the volume of cold air) passing through the bypass passage 16 is adjusted by the degree of opening of the air mixing door 17, the temperature of air blowing out into the vehicle passenger compartment can be adjusted. The flow of air, the temperature of which has been adjusted in this way, blows out into the vehicle passenger compartment from one, or from a plurality, of the defroster blowout port 19, the face blowout port 20 and the foot blowout port 21 which are located in the most downstream portion of the air passage of the case 2, and the vehicle passenger compartment can be air-conditioned and, further, the windshield W of the vehicle can be prevented from fogging. Next, referring to FIG. 3, automatic control of air-conditioning conducted in this embodiment will be explained below. FIG. 3 is a flow chart of the control routine carried out by the microcomputer of the air-conditioning control unit 30. This control routine is started when the auto-switch 43 is turned on. First, the initial setting is conducted in step S10. Then, in the next step S20, the detection signals of a group of sensors 31 to 35 and various operation signals sent from the air-conditioning panel 36 are read in.

Next, in step S30, target blowout temperature TAO of air blown out into the vehicle passenger compartment is calculated. This target blowout temperature TAO of air is a temperature of the air blown out into the vehicle passenger compartment necessary for maintaining the temperature in the vehicle passenger compartment at the setting temperature $T_{set}$ which has been set by a passenger with the temperature setting switch 37 on the air-conditioning panel 36. This TAO is calculated by the following expression (1) according to the setting temperature $T_{set}$ which is set by the passenger, the outside air temperature $T_{am}$, the inside air temperature $T_r$ and the amount of sunshine $T_s$.

$$TAO=K_{set} \times T_{set} - K_r \times T_r - K_{am} \times T_{am} - K_s \times Ts + C \quad (1)$$

$K_{set}$, $K_r$, $T_r$, $K_{am}$ and $K_s$: control gain

C: Constant used for correction

Next, in step S40, the target evaporator blowout temperature TEO is calculated. In this case, the target evaporator blowout temperature TEO is a control value which is determined for controlling the temperature of the interior blowout air, controlling the occurrence of fogging on windshield W and controlling energy consumed by the compressor 11 so that energy can be saved. The target evaporator blowout temperature TEO is calculated according to the target blowout temperature TAO, the outside air temperature $T_{am}$ and the humidity inside the vehicle passenger compartment.

Next, in step S50, the target degree of opening SW of the air mixing door 17 is calculated by the following expression (2) according to the target blowout temperature TAO, the evaporator blowout air temperature $T_e$ detected by the evaporator temperature sensor 34, and the hot water temperature $T_w$ detected by the water temperature sensor 44.

$$SW=\{(TAO-T_e)/(T_w-T_e)\} \times 100\% \quad (2)$$

In this connection, SW=0 is the maximum cooling position of the air mixing door 17. At this maximum cooling position of the air mixing door 17, the bypass passage 16 is fully opened, and the air passage on the heater core 15 side is completely closed. On the other hand, SW=100% is the maximum heating position of the air mixing door 17. At this maximum heating position of the air mixing door 17, the bypass passage 16 is completely closed, and the air passage on the heater core 15 side is fully opened.

Next, in step S60, the inside and outside air suction mode is determined according to the target blowout temperature TAO. Specifically, as the target blowout temperature TAO changes from the low temperature side to the high temperature side, the inside and outside air suction mode is switched in the order of inside air mode→outside air mode. As the target blowout temperature TAO changes from the low temperature side to the high temperature side, the inside and outside air suction mode may be switched in the order of inside air mode→inside and outside air mixing mode→outside air mode. In this connection, in the case where a passenger operates the inside and outside air changeover switch 39 on the air-conditioning panel 36, it is determined that the mode operated by the passenger is the inside and outside air suction mode.

Next, in step S70, the blowout mode of the blowout air in the vehicle passenger compartment is determined according to the target blowout temperature TAO. Specifically, as the target blowout temperature TAO changes from the low temperature side to the high temperature side, the blowout mode is successively switched in the order of face mode→bilevel mode→foot mode. In this connection, in the case where the passenger operates the blowout mode switch 38 on the air-conditioning panel 36, it is determined that the mode operated by the passenger is a blowout mode. In this embodiment, the foot defroster mode and the defroster mode are set only by the operation conducted by the passenger.

Next, in step S80, the target air volume of the blowout air blown out into the vehicle passenger compartment is calculated. The calculation of this target air volume will be described in detail later referring to FIG. 4.

In step S90, the capacity of the compressor 11 is controlled. Specifically, ON-OFF of energizing the electromagnetic clutch 11a of the compressor 11 is determined in step S90. In this embodiment, a fixed capacity type compressor, the discharging capacity of which is always constant, is used for the compressor 11. Therefore, when the actual blowout air temperature $T_e$ of the evaporator 9 is lowered to the target evaporator blowout temperature TEO, an electric current supplied to the electromagnetic clutch 11a is shut off and the compressor 11 is stopped.

Due to the foregoing, when the actual blowout air temperature $T_e$ of the evaporator 9 is raised to the target evaporator blowout temperature TEO+α, the electromagnetic clutch 11a is energized and the compressor is put into an operating state. When the compressor is intermittently operated as described above, the rate of operation of the compressor 11 is controlled, and, further, the refrigerant discharging capacity is controlled, and the actual blowout air temperature $T_e$ of the evaporator 9 is maintained at a value close to the target evaporator blowout temperature TEO. In this case, α is the width of hysteresis for preventing the occurrence of hunting, for example, α is approximately 1° C.

In the next step, S100, signals of the control values calculated and determined in the above steps S50 to S90 are outputted to various devices (the electromagnetic clutch 11a, various servo motors 7, 18, 25 and fan motor 8b) which are objects to be controlled so that the various devices can be driven.

Figure 4:
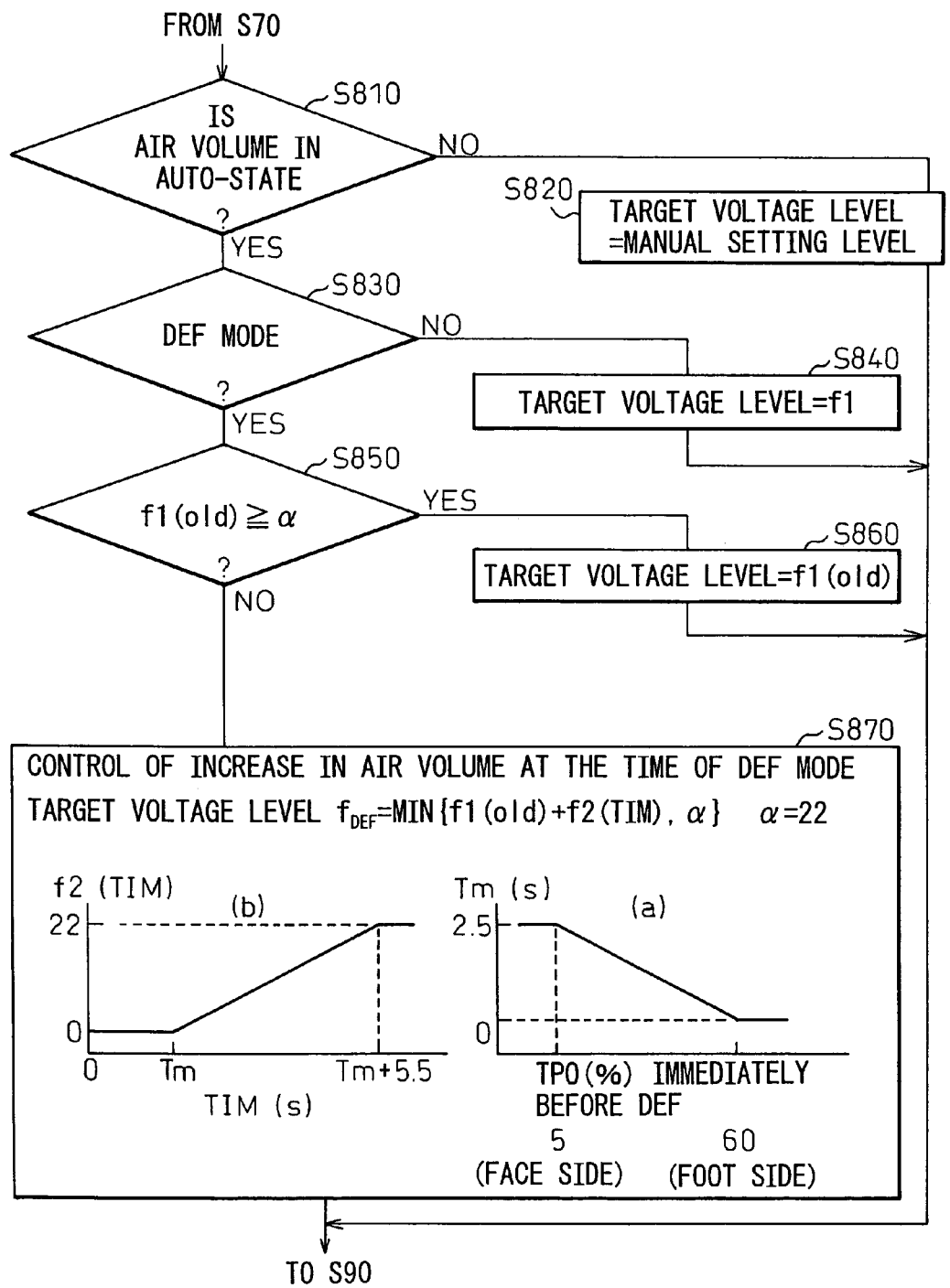
FIG. 4 is a flow chart of controlling a volume of air in the first embodiment.

Next, FIG. 4 is a subroutine showing a specific example of the calculation of the target air volume conducted in the above step S80. First, whether or not the air volume setting is in the auto-state in step S810 is determined according to whether or not the air volume changeover switch 42 on the air-conditioning panel 36 is turned on. That is, in the case where the air volume changeover switch 42 is not turned on, it is judged that the air volume setting is in the auto-state. In the case where the air volume changeover switch 42 is turned on, it is judged that the air volume setting is not in the auto-state.

In the case where the air volume setting is not in the auto-state, the program proceeds to step S820, and the air volume, which has been manually set by the air volume changeover switch 42, is determined to be a target air volume. In this connection, more specifically, the target air volume is determined as a voltage level (fan level) impressed upon the fan motor 8b. Therefore, in the following descriptions, the explanations will be made using the term "target air volume" instead of the term "target voltage level".

This target voltage level can be finely variably controlled to multiple stages by the drive control circuit of driving the fan motor 8b provided in the control unit 30. In this embodiment, concerning the target voltage level, the level 32 is the maximum voltage level.

Accordingly, when the switch 42e for supplying a large volume of air provided in the air volume changeover switch 42 is operated, the level 32 levels is selected as the target voltage level. Therefore, the maximum blowout air volume can be obtained at the maximum rotating speed of the fan motor 8b.

In this embodiment, the minimum level of the target voltage level is set at 5 levels. Therefore, when the switch 42b for supplying a small volume of air provided in the air volume changeover switch is operated, one of the 5 levels is selected for the target voltage level. Therefore, the fan motor 8b is rotated at the minimum rotating speed, and the minimum volume of blowout air can be obtained.

On the other hand, when it is judged that the air volume setting is in the auto-state in step S810, it is judged in step S830 whether or not the blowout mode is the defroster mode (DEF). In this case, the blowout mode is determined in the above step S70. When the blowout mode is not the defroster mode, that is, the blowout mode is one of the face mode, the bilevel mode, the foot mode and the foot defroster mode, the judgment NO is made in step S830, and the program proceeds to step S840 and the target voltage level is set at the target voltage level f1 which is determined by the usual auto-control.

Specifically, as shown in FIG. 5, the target voltage level f1 is determined by the target blowout temperature TAO. The target voltage level f1 is increased on the low temperature side (the maximum cooling side) of the target blowout temperature TAO and on the high temperature side (the maximum heating side) of the target blowout temperature TAO. The target voltage level f1 is decreased to the minimum level in the predetermined intermediate temperature region (the comfortable temperature region of about 25° C.) of the target blowout temperature TAO.

That is, on the low temperature side (the maximum cooling side) of TAO, the target voltage level f1 is set at the level 32, which is the maximum level, so that the target air volume can be maximized. On the high temperature side (the maximum heating side) of TAO the necessary air volume may be smaller than the air volume on the maximum cooling side. Therefore, the target voltage level f1 is set at the level 28 so that the target air volume can be somewhat smaller than the maximum air volume on the maximum cooling side. In the predetermined intermediate temperature region of TAO, the target voltage level f1 is set at the level 5 which is the minimum level so that the target air volume can be minimized.

On the other hand, when it is judged in step S830 that the blowout mode is the defroster mode, the program proceeds to step S850, and it is judged whether or not the target voltage level f1 (old) immediately before the mode is switched to the defroster mode is not less than the predetermined level α.

This predetermined level α is the target voltage level (the target air volume) necessary for exhibiting a predetermined performance for preventing the windshield from fogging at the time of the defroster mode. In this embodiment, this predetermined level α is set at level α=22. In this connection, the target voltage level f1 (old) immediately before the mode is switched to the defroster mode is the target voltage level f1 which is calculated in step S840 immediately before the defroster switch 38e is turned on.

In the case where the target voltage level f1 (old) immediately before the mode is switched to the defroster mode is not less than the predetermined level α, the program proceeds to step S860, and this target voltage level f1 (old) is determined to be the target voltage level (the target air volume) at the time of the defroster mode as it is. The reason is that the target voltage level f1 (old) immediately before the mode is switched to the defroster mode is not less than the predetermined level α and no problems are caused in exhibiting the necessary performance for preventing the windshield from fogging at the time of the defroster mode.

When it is judged in step S850 that the target voltage level f1 (old) immediately before the mode is switched is lower than the predetermined level, the program proceeds to the next step S870 and the air volume increasing control at the time of the defroster mode is conducted.

In this step S870, the target voltage level (the target air volume) $f_{DEF}$ for increasing an air volume at the time of the defroster mode is calculated by the following expression (3).

$$f_{DEF} = \text{MIN}\{f1(\text{old}) + f2(TIM), \alpha\} \quad (3)$$

In this case, f2(TIM) is an increase in the air volume according to the switching to the defroster mode. f2(TIM) is calculated according to the maps (a), (b) in step S870. First, $T_m$ is calculated according to the map (a). $T_m$ is the time (The unit is second.) for determining the point of time at which an increase in the blowout air volume (the target voltage level) blown into the vehicle passenger compartment is started after the defroster mode changeover signal is generated when the passenger manually operates the defroster switch 38e of the blowout mode switch 38.

The axis of abscissa of the map (a) is the resistance value ratio TPO (%) of the potentiometer 25a (shown in FIG. 1) which is a motor operating position detecting means provided in the servo motor 25 for switching the blowout mode. The resistance value ratio TPO changes according to a change in the operational angle range of the servo motor 25. When the operational angle of the servo motor 25 is the minimum, the resistance value ratio TPO=0%. When the operational angle of the servo motor 25 is the maximum, the resistance value ratio TPO=100%.

In this embodiment, on the minimum side of the operational angle of the servo motor 25, the face mode is set. As the operational angle of the servo motor 25 is increased, the mode is successively switched in the order of bilevel mode→foot mode→foot defroster mode→defroster mode. Value $T_m$ is the maximum (Specifically, the value $T_m$ is 2.5 seconds.) in the range in which the resistance value ratio TPO≦5% (on the face mode side). As the resistance value ratio TPO is increased, the value $T_m$ is continuously decreased by a constant ratio. In the range in which the resistance value ratio TPO≧60% (the blowout mode after the foot mode), the value $T_m$ is 0.

As described above, the value $T_m$ is determined so that it can be increased and decreased according to the blowout mode immediately before the mode is changed over to the defroster mode. In this connection, in the case where value $T_m$=0 (in the case where the blowout mode immediately before the changeover is the blowout mode after the foot mode), simultaneously when the mode is switched to the defroster mode, an increase in the blowout air volume (the target voltage level) blown out into the vehicle passenger compartment is started.

Next, the map (b) is provided for calculating an increase f2 (TIM) in the voltage level corresponding to an increase in the air volume according to the switching to the defroster mode. In the map (b), the axis of abscissa is the passing time TIM (The unit is second.) which has passed after a switching signal to the defroster mode was generated by the manual operation of the defroster switch 38e.

While the passing time TIM is shorter than the value $T_m$, the increase f2 (TIM) in the voltage level is 0. When the passing time TIM is increased to a value not less than the value $T_m$, the increase f2 (TIM) in the voltage level starts increasing from 0. As the passing time goes, the increase f2 (TIM) in the voltage level is continuously increased at a predetermined ratio.

In the above expression (3), f1 (old) is the target voltage level (the target air volume), which is determined by the auto-control in step S840, immediately before the mode is switched to the defroster mode. In the above expression (3), α is the minimum motor voltage (the air volume) necessary for ensuring the performance to remove fogging from the windshield at the time of the defroster mode. In this embodiment, α is set at the level α=22.

As can be understood from the above expression (3), when the value, which is obtained when the increase f2 (TIM) of the voltage level is added to the target voltage level f1 (old) immediately before the mode is switched to the defroster mode, and α(=level 22) are compared with each other, the lower one is determined to be the target value, that is, the lower one is determined to be the target voltage level (the target air volume) $f_{DEF}$ exclusively used at the time of the defroster mode.

According to this embodiment, the increase starting point of time of the increase f2 (TIM) in the voltage level according to the switching to the defroster mode is changed according to the blowout mode immediately before the mode is switched to the defroster mode. Specifically, operation is conducted as follows. When the blowout mode immediately before the switching to the defroster mode is the face mode, after a switching signal to the defroster mode is generated, the point of time, at which an increase in the voltage level (the air volume) is started, is delayed to the maximum (the delay time=2.5 sec). In the case where the blowout mode doors 22, 23, 24 are at the positions of the face mode positions, an increase in the voltage level (the air volume) is not started. After the blowout mode doors 22, 23, 24 have passed through the face mode positions and the bilevel positions, the increase in the voltage level (the air volume) is started for the first time.

Therefore, after the switching signal to the defroster mode has been generated, in the process in which the blowout mode doors 22, 23, 24 are moved from the face mode positions to the defroster mode positions by the operation of the servo motor 25, it is possible to positively prevent a flow of conditioned air, the volume of which is increased, from blowing out from the face blowout port 20. Due to the foregoing, the annoyance that a sound intensity of noise caused by air blown out from the face blowout port 20, which is located at the closest position to the ears of the passenger, at the time of switching to the defroster mode can be previously eliminated.

In this connection, in the first embodiment, step S870 composes "a defroster mode air volume control means for determining the point of time at which an increase in the target air volume is started".

Next, a second embodiment will be explained below. In the above first embodiment, an operation is conducted as follows. After the defroster mode switching signal has been generated according to the map (a) shown in step S870 in FIG. 4, the time $T_m$ for determining the point of time, at which an increase in the air volume blown into the vehicle passenger compartment is determined, is decided according to the blowout mode immediately before the switching to the defroster mode. After the time TIM after the defroster mode switching signal has been generated and the time $T_m$ for determining the air volume increase starting time, "the voltage level (air volume) increase f2 (TIM) according to the switching to the defroster mode" is calculated. However, in the second embodiment, the calculation of the time $T_m$ for determining the air volume increase starting time by the map (a) is not done. Instead of that, the air volume increase starting time is directly decided by the operational angle of the servo motor 25 for switching the blowout mode.

That is, in the second embodiment, according to the switching to the defroster mode, the operational angle of the servo motor 25 for switching the blowout mode becomes a predetermined value corresponding to the foot mode position. That the operational angle of the servo motor 25 for switching the blowout mode becomes a predetermined value corresponding to the foot mode position is judged by the resistance ratio TPO=60% of the potentiometer 25a. The point of time at which the operational angel of the servo motor 25 has come to the foot mode position is set at the air volume increase starting time t0 shown in the map of FIG. 6.

As the passing time TIM from this air volume increase starting time t0 increases, the voltage level (the air volume) increase f2 (TIM) is continuously increased by a predetermined ratio. In this way, the same operational effect as that of the first embodiment can be provided.

Next, the third embodiment will be explained below. In the first and the second embodiment, in the case of calculating the voltage level (the air volume) increase f2 (TIM), the calculation is made in such a manner that the voltage level increase f2 (TIM) is continuously increased by a predetermined ratio as the time passes from the air volume increase starting time $T_m$. However, in the third embodiment, when the mode is switched to the defroster mode, according to the change in the operational angle of the servo motor 25, the target voltage level (the target air volume) $f_{DEF}$ at the time of the defroster mode is directly determined.

FIG. 7 is a view showing a specific example of the third embodiment. FIG. 7 exemplarily shows a case in which the blowout mode immediately before the mode is switched to the defroster mode is the face mode and the voltage (the air volume) level f1 (old) immediately before switching the mode is the level 5 which is the minimum level and the passenger manually operates so that the mode can be switched to the defroster mode.

In this case, when the mode is switched from the face mode to the defroster mode, as the operational angle of the servo motor 25 is increased from the minimum side to the maximum side, the blowout mode is successively switched in the order of face mode→bilevel mode→foot mode→foot defroster mode→defroster mode.

Therefore, in the third embodiment, while being linked with the change in the operational angle (the switching of the blowout mode) of the servo motor 25, as shown in items (a) and (b) of FIG. 7, the target voltage level $f_{DEF}$ at the time of the defroster mode is directly determined. In the case shown in the item (a) of FIG. 7, while the operational angle of the servo motor 25 is in a range corresponding to the face mode position and the bilevel mode position, the target voltage level $f_{DEF}$ is maintained at the level 5 which is the value immediately before the blowout mode is switched.

When the operational angle of the servo motor 25 is increased to a value corresponding to the foot mode position, an increase in the target voltage level $f_{DEF}$ is started. That is, when the operational angle of the servo motor 25 is increased to a value corresponding to the foot mode position, the target voltage level $f_{DEF}$ is increased to the level 7. After that, the target voltage level $f_{DEF}$ is successively increased to the levels 15 and 22.

In the case shown in the item (b) of FIG. 7, while the operational angle of the servo motor 25 is a value corresponding to the position from the face mode position to the foot mode position, the target voltage level $f_{DEF}$ is maintained at the level 5. Then, when the operational angle of the servo motor 25 is increased to a value corresponding to the foot defroster mode, the target voltage level $f_{DEF}$ is increased to the level 15 for the first time. At the operational angle corresponding to the defroster mode, the target-voltage level $f_{DEF}$ is increased to the level 22.

In the third embodiment, the operational angle of the servo motor 25 may be judged by the resistance ratio TPO of the aforementioned potentiometer 25a.

Even in the third embodiment, when the mode is switched to the defroster mode, it is possible to evade an increase in the blowout air volume from the face blowout port 20. Further, according to the third embodiment, the control processing to determine the target voltage level $f_{DEF}$ at the time of the defroster mode can be simplified as compared with the first and the second embodiment.

Finally, another embodiment will be explained below. It should be noted that the present invention is not limited to the above specific embodiments and variations may be made as in the examples shown below.

(1) In the first embodiment, according to the resistance value ratio of the potentiometer 25a to detect the operational angle of the servo motor 25 for switching the blowout mode, the blowout mode immediately before the switching to the defroster mode is grasped. However, as the servo motor 25 for switching the blowout mode, the blowout mode doors 22, 23, 24 and the link mechanism are integrally linked with each other and operated, a position detecting means like the potentiometer 25a may be provided not on the servo motor side but on the blowout mode doors 22, 23, 24 side or the link mechanism side so that the blowout mode immediately before the switching to the defroster mode can be grasped.

Without providing the position detecting means like the potentiometer 25a, the blowout mode immediately before the switching to the defroster mode may be grasped according to the blowout mode command signal outputted from the control unit 30 to the servo motor 25.

In the second and the third embodiment, a change in the operational angle of the servo motor 25 (a switching of the blowout mode) may be grasped by the position detecting means provided not on the servo motor 25 side but on the blowout mode door 22, 23, 24 side or on the link mechanism side.

(2) In the above embodiment, at the time of switching the mode to the defroster mode, in order to enhance the performance of removing fogging from the windshield, the air volume increasing control is adopted. However, in another mode, except for the defroster mode, when the mode is switched to the foot defroster mode, the air volume increasing control is may be adopted in order to enhance the performance of removing the fogging from the windshield in the same manner. In this case, the target air volume may be calculated at the time of foot defroster mode while the method of calculating the target air volume at the time of the defroster mode is being introduced.

(3) In the above embodiment, the passenger manually switches the mode to the defroster mode. However, the defroster mode and the foot defroster mode may be automatically set when the control unit 30 judges the circumstances in which the windshield of the vehicle tends to fog, that is, when the control unit 30 judges a state of low temperature of the windshield or a state of high humidity of the air in the vehicle passenger compartment.

Even at the time of the defroster mode or the foot defroster mode in which the automatic setting is conducted as described above, the target air volume calculation may be made in the same manner as that of the above embodiment.

(4) In the above embodiment, the blowout mode doors 22, 23, 24 are composed of three plate doors. However, the blowout mode doors 22, 23, 24 may be composed of two plate doors. Alternatively, the blowout mode doors 22, 23, 24 may be composed of one door means such as the well-known film door or a rotary door.

While the invention has been described by reference to specific embodiments chosen for purposes of illustration, it should be apparent that numerous modifications could be made thereto, by those skilled in the art, without departing from the basic concept and scope of the invention.

The invention claimed is:

1. An air-conditioner for vehicle use comprising:
   an air blowing means (8) for blowing air toward a vehicle passenger compartment;
   a face blowout port (20) for blowing out air sent from the air blowing means (8) to a passenger face side in the vehicle passenger compartment;
   a foot blowout port (21) for blowing out air sent from the air blowing means (8) to a passenger foot side in the vehicle passenger compartment;
   a defroster blowout port (19) for blowing out air sent from the air blowing means (8) to a windshield side in the vehicle passenger compartment;
   blowout mode doors (22 to 24) for switching a blowout mode at least among a face mode in which air is blown out from the face blowout port (20), a foot mode in which air is blown out from the foot blowout port (21) and a defroster mode in which air is blown out from the defroster blowout port (19);
   a door drive device (25) for driving the blowout mode doors (22 to 24); and
   a control unit (30) for controlling the air blowing means (8) so that an air volume of the air blowing means (8) can be a target air volume and for controlling an operational position of the door drive device (25) so that each blowout mode can be provided, wherein
   when a switching signal to switch the mode to the defroster mode is generated and the target air volume is smaller than a predetermined air volume, the target air volume is automatically increased to the predetermined air volume, and
   the control unit (30) includes a defroster mode air volume control means (S870) for determining an increase starting point of time of increasing the target air volume according to the blowout mode when a switch signal to switch the mode to the defroster mode is generated.

2. An air-conditioner for vehicle use according to claim 1, wherein the defroster mode air volume control means (S870) determines the increase starting point of time of the target air volume according to the blowout mode immediately before the generation of a switch signal when the switch signal to switch the mode to the defroster mode is generated.

3. An air-conditioner for vehicle use according to claim 1, wherein the defroster mode air volume control means (S870) starts increasing the target air volume after an operational position of the door drive device (25) has passed through the position corresponding to the face mode in the case where the blowout mode immediately before the switching signal is generated is a face mode.

4. An air-conditioner for vehicle use according to claim 1, wherein the defroster mode air volume control means (S870) calculates the time ($T_m$) to determine the increase starting point of time of increasing the target air volume according to the blowout mode at the time of generation of the switching signal, and
   the target air volume starts increasing when the time ($T_m$) has passed after the generation of the switching signal.

5. An air-conditioner for vehicle use according to claim 1, further comprising a position detecting means (25a) for detecting positional information relating to an operational position of the door drive device (25), wherein the defroster mode air volume control means (S870) judges the blowout mode at the time of generation of the switching signal according to the detection signal from the position detecting means (25a).

6. An air-conditioner for vehicle use according to claim 1, wherein the blowout mode doors (22 to 24) switch the blowout mode in the order of the face mode, the foot mode and the defroster mode by changing the operational position of the door drive device (25), and
   the defroster mode air volume control means (S870) starts increasing the target air volume after the operational position of the door drive device (25) has been moved to a position corresponding to the foot mode when the switching signal is generated.

7. An air-conditioner for vehicle use according to claim 6, further comprising a position detecting means (25a) for detecting positional information relating to the operational position of the door drive device (25), wherein
   it is judged according to the detection signal from the position detecting means (25a) that the operational position of the door drive device (25) is moved to a position corresponding to the foot mode.

8. An air-conditioner for vehicle use according to claim 1, wherein the target air volume is increased by a predetermined ratio with respect to the time which has passed after the increase starting point of time.

9. An air-conditioner for vehicle use according to claim 1, wherein when the target air volume immediately before the generation of the switching signal is not less than the predetermined air volume, this target air volume is made to be a target air volume at the time of the defroster mode.

* * * * *